April 2, 1935.  E. D. SCHLEGEL  1,996,690
POULTRY FEEDING TROUGH
Filed April 20, 1933
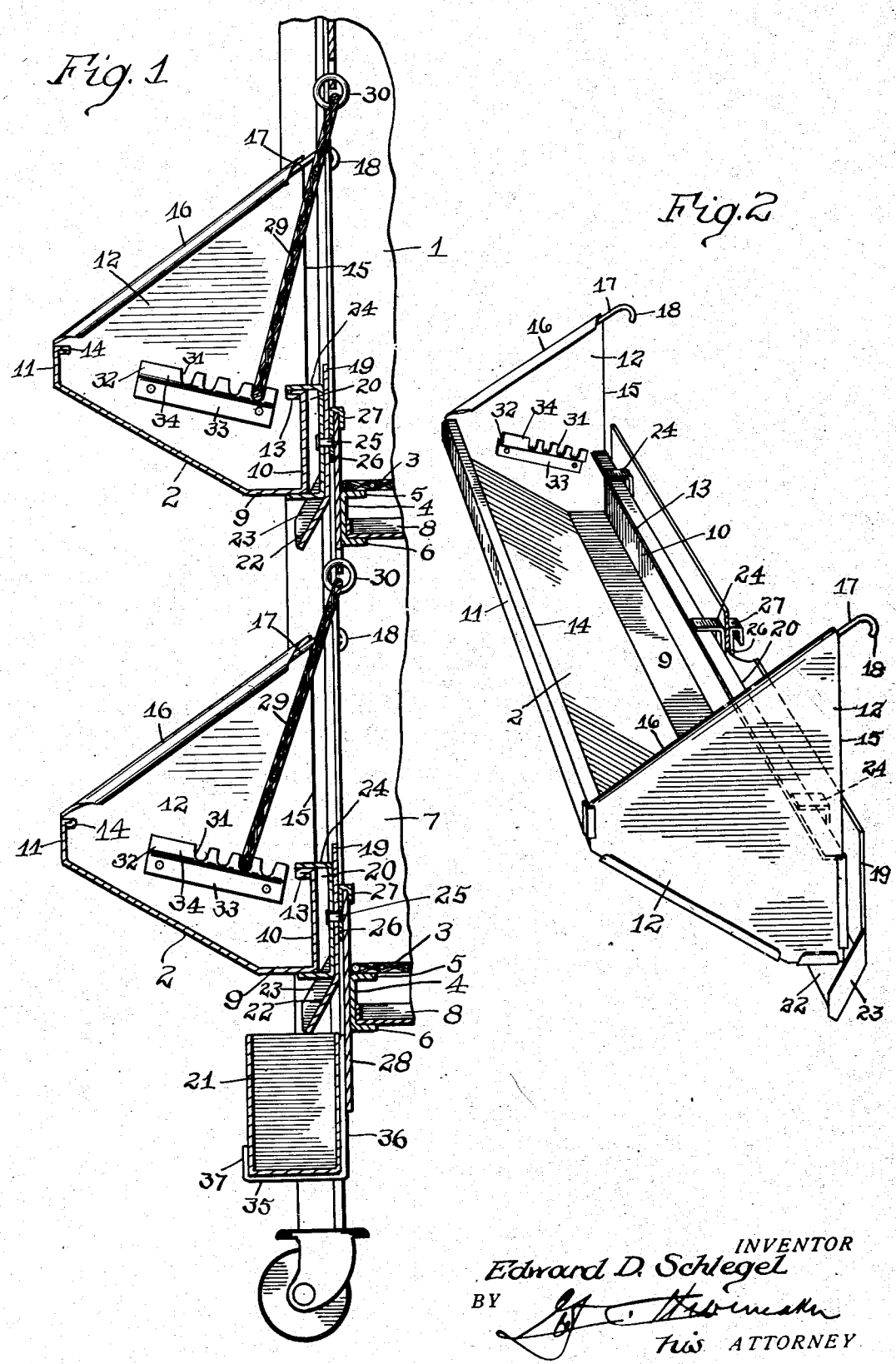
INVENTOR
Edward D. Schlegel
BY
His ATTORNEY Patented Apr. 2, 1935

1,996,690

UNITED STATES PATENT OFFICE 1,996,690

POULTRY FEEDING TROUGH

Edward D. Schlegel, Rochester, N. Y.

Application April 20, 1933, Serial No. 667,081

5 Claims. (Cl. 119—17)

The invention relates to a battery feed saver for brooders, chicken coops and the like.

The object of the present invention is to improve the construction of battery feeders for battery brooders although it is to be understood this term is intended to include chicken coops and the like in which feed troughs are arranged in a vertical series or battery and detachably mounted in position on the brooder or chicken coop at the various compartments thereof for supplying chickens and other fowls of all sizes with feed and to provide simple, practical and efficient means for preventing unconsumed feed from being scattered over the floor or dropping pan and thereby becoming fouled or unfit for food and wasted.

A further object of the invention is to provide for the superimposed feed troughs an attachment adapted to save the feed which is scattered by the chickens or other fowls and cause the scattered feed to pass downward from one trough to another and from the bottom trough into a receptacle so that feed scattered in one trough may be consumed in another trough and the feed scattered in the bottom trough collected in a receptacle in a condition in which it may be used again until finally consumed by the fowls.

Another object of the invention is to provide an attachment of this character adapted to be applied to troughs of various constructions and capable of forming a passageway for the scattered feed to deliver the same from one trough to another or to the bottom receptacle and at the same time form a shield or guard to prevent such feed from being scattered over the floor of the compartment containing the chickens or other fowl using the feed trough.

Another object of the invention is to provide a battery food saver which will insure nothing but the best feed being eaten by poultry so that the poultry may be prevented from consuming dirt and gravel and to feed a perfectly balanced food without waste and with a saving of from twenty-five to fifty percent of the feed.

Another object of the invention is to enable a sufficient quantity of feed to be supplied to chickens and other fowl to last an entire day so that only a single feeding will be required and the chickens and other fowl will always have a supply of food in front of them and will eat more feed and increase in weight more rapidly than when the feed is supplied at intervals during the day and there are periods when there is practically no feed in the feed troughs.

A further object of the invention is to provide an attachment which may be readily manufactured at a low cost and which may be easily applied to an ordinary feed trough of the battery type without materially increasing the cost of the same so that the saving of feed heretofore wasted will in a very short time more than compensate for any increase in the cost of the feed troughs.

Furthermore it is an object of the invention to prevent any of the feed from mixing with the droppings so that the latter may be used as a fertilizer without souring the ground as is the case when a considerable quantity of feed is scattered over the floor or dropping pan.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

Figure 1 is a vertical sectional view of a portion of a battery brooder provided with a battery of feed savers constructed in accordance with this invention.

Fig. 2 is a perspective view of one of the feed troughs provided with my improvements.

In the accompanying drawing in which is illustrated the preferred embodiment of the invention 1 designates a battery brooder which is provided at the front with a battery of feed troughs 2 arranged one above another in a vertical series. The battery may consist of any number of feed troughs as will be readily understood, but for convenience of illustration only two of the battery of feed troughs are illustrated in the drawing. The battery brooder which may be of any desired construction is preferably in the form of a cage divided into a plurality of compartments by horizontal floors or partitions 3 preferably consisting of reticulated material such as woven wire and supported by channel members 4 having upper and lower horizontal flanges 5 and 6 and a vertical connecting web.

The upper flange 5 supports the floor of the compartment 7 and the lower flange provides a convenient support for a dropping pan 8 located beneath the floor 3 and adapted to catch the droppings in the usual manner.

The feed troughs are preferably constructed of galvanized sheet metal or other suitable material and each feed trough consists of a bottom 9, inner and outer side walls 10 and 11 and end walls 12. The bottom consists of an inner relatively narrow horizontal portion and a relatively wide inclined portion which is adapted to direct the feed inwardly so that there will always be a quantity of feed at the inner portion of the feed trough until the same is practically consumed. The inner and outer side walls are vertical and are provided at their upper edges with horizontal flanges 13 and 14 projecting inwardly over the feed trough. The end walls are tapered upwardly and have lower edges conforming to the configuration of the bottom of the feed trough. The inner edges 15 of the end walls 12 are vertical and the upper edges are inclined and are preferably rolled to form a bead 16 within the upper portions of which are secured shanks 17 of hooks 18 adapted to engage portions of the cage for assisting in supporting the feed trough detachably thereon.

Each feed trough is provided at its inner side with an auxiliary inner wall 19 consisting of a plate or piece of sheet metal arranged in spaced relation to the inner side wall 10 of the feed trough to provide a passageway 20 for the scattered feed for causing the feed which would otherwise be wasted to pass downward from one feed trough to another and from the bottom feed trough to a receptacle 21 whereby the feed which is ordinarily wasted will be either consumed in one feed trough or another or finally collected in the receptacle 21 for subsequent use.

The auxiliary inner wall 19 consists of a vertical body portion and a downwardly and outwardly inclined lower portion 22 constituting a deflecting flange and arranged to project over the next lower trough or over the receptacle 21, as clearly illustrated in Fig. 1 of the drawing. The inclined deflecting flange is provided with end walls 23 and forms a chute for directing the feed into a feed trough or the receptacle 21. The vertical body portion of the auxiliary wall is extended above the plane of the upper edge of the inner wall 10 of the feed trough to form a guard for effectually preventing any meal or other feed from being billed or scattered onto the floor of the brooder or chicken coop.

The auxiliary wall 19 is rigidly connected with the feed trough in spaced relation with the inner wall thereof by means of a plurality of approximately U-shaped brackets 24 preferably located at the central and end portions of the auxiliary wall, as clearly illustrated in Fig. 2 of the drawing, and consisting of vertical portions and upper and lower horizontal portions which are soldered or otherwise secured to the flange 13 and to the bottom of the feed trough. The brackets are secured to the auxiliary wall 19 by rivets 25 which also pass through the shanks 26 of hooks 27 which engage over the upper edge of a plate or frame member 28 of the frame of the cage which constitutes the brooder or chicken coop. The hooks 18 and 27 firmly and detachably support the feed trough in position at the front of the compartment 7.

The compartment 7 is open above the upper edge of the plate 28 and the chickens or other fowls are prevented from entering the feed trough by means of an adjustable inclined screen 29 hinged at its upper edge by means of rings 30 to the framework of the cage and extending downwardly and outwardly and adapted to have its lower edge fitted in notches 31 of brackets 32 consisting of strips of sheet metal angularly bent to form a lower attaching portion 33, upper flange 34 and a connecting portion which offsets the flange 34 from the wall. As the chickens or other fowls increase in size the inclined screen is adjusted to provide sufficient space between the flange 13 and the screen to permit ready access to the feed within the feed trough.

The receptacle 21 is removably supported in suitable brackets 35 preferably consisting of a horizontal supporting portion, an inner vertical attaching portion 36 and an outer upwardly extending retaining portion 37 which confines the receptacle in the brackets 35. Any other suitable means may of course be employed for detachably supporting the receptacle in position beneath the lower feed trough to receive feed passing downward through the space or passageway 20 thereof.

In operation the feed troughs of the batteries are supplied with feed and are mounted in position on the cage in front of the compartments thereof and the inclined screens are adjusted to suit the size of the chickens or other poultry. A sufficient quantity of feed may be placed in the trough to last an entire day without danger of any of the feed becoming wasted.

A supply of food will be maintained in front of the chickens or other poultry at all times and the auxiliary walls which form guards and which provide passageways for the scattered feed will prevent the feed from being wasted and the scattered feed will be either consumed in the various feed troughs or collected in the receptacle 21.

What is claimed is:—

1. A battery feed trough designed to be mounted on a battery brooder and having an inner vertical side wall and provided with an inner auxiliary wall arranged exteriorly of the said side wall in spaced relation with the same, approximately U-shaped brackets secured to the auxiliary wall and having their terminal portions secured to the feed trough at the top and bottom of the inner side wall, and hooks secured to the inner auxiliary wall and arranged to engage the brooder.

2. A battery feed trough designed to be mounted on a battery brooder and having an inner side wall, an inner auxiliary wall rigidly connected with the trough in spaced relation with the inner side wall to form a space or passage for scattered feed, and hooks secured to the inner auxiliary wall and arranged to engage the brooder.

3. A battery feed saver comprising a plurality of detachable troughs arranged in a vertical series one above another on a battery brooder, each of said troughs having an inner vertical side wall and provided with an inner auxiliary wall arranged exteriorly of the inner side wall in spaced relation with the same and forming a passage for saving scattered feed and provided at the bottom at the inner side of the trough with means for directing feed outwardly into a lower trough, and means for detachably securing the feed troughs to a chicken coop and for permitting the troughs to be removed and replaced individually.

4. A battery feed saver comprising a plurality of detachable troughs arranged in a vertical series one above another on a battery brooder, each of said troughs having an inner vertical side wall and provided with an inner auxiliary wall arranged exteriorly of the inner side wall in spaced relation with the same and forming a passage for saving scattered feed and provided at the inner side of the trough with an outlet and provided at the bottom with means for directing it outwardly into a lower trough, means for detachably securing the feed troughs to a chicken coop and for permitting the troughs to be removed and replaced individually, a receptacle located at the bottom of the series of said troughs in position to receive feed from the passage of the said lower trough, and a bracket removably supporting the receptacle beneath the bottom trough.

5. A battery poultry feeder comprising a plurality of troughs for detachable connection in a vertical series with a battery brooder, each of said troughs having at its inner side an upright side wall and an auxiliary upright wall secured in spaced relation to said side wall, said walls forming between them a passage for saving scattered seed having a lower outlet for guiding the seed into the next lower-most trough, and means carried by each trough detachably engaging the brooder to permit individual removal and replacement of the troughs, including hook members in connection with said inner side wall.

EDWARD D. SCHLEGEL.